United States Patent
Olson et al.

(10) Patent No.: US 10,775,158 B2
(45) Date of Patent: Sep. 15, 2020

(54) SYSTEM AND METHOD FOR DETECTING ETCH DEPTH OF ANGLED SURFACE RELIEF GRATINGS

(71) Applicant: APPLIED Materials, Inc., Santa Clara, CA (US)

(72) Inventors: Joseph C. Olson, Beverly, MA (US); Ludovic Godet, Sunnyvale, CA (US); Rutger Meyer Timmerman Thijssen, Sunnyvale, CA (US); Morgan Evans, Manchester, MA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 16/240,301

(22) Filed: Jan. 4, 2019

(65) Prior Publication Data
US 2020/0158495 A1    May 21, 2020

Related U.S. Application Data (60) Provisional application No. 62/767,944, filed on Nov. 15, 2018.

(51) Int. Cl.
| | | |
|---|---|---|
| *G01B 11/22* | (2006.01) | |
| *H01L 21/306* | (2006.01) | |
| *C03C 15/00* | (2006.01) | |
| *G02B 5/18* | (2006.01) | |

(52) U.S. Cl.
CPC .............. *G01B 11/22* (2013.01); *C03C 15/00* (2013.01); *G02B 5/1857* (2013.01)

(58) Field of Classification Search
None
See application file for complete search history.

(56) References Cited

U.S. PATENT DOCUMENTS

| | | | | |
|---|---|---|---|---|
| 5,116,461 | A * | 5/1992 | Lebby | G02B 5/1857 204/192.34 |
| 2007/0153298 | A1* | 7/2007 | Fukui | G01B 11/0625 356/632 |
| 2014/0144506 | A1 | 5/2014 | Iizuka et al. | |
| 2016/0033697 | A1 | 2/2016 | Sainiemi et al. | |
| 2016/0061822 | A1 | 3/2016 | Saar et al. | |
| 2019/0258008 | A1* | 8/2019 | Hautala | G02B 5/1857 |

FOREIGN PATENT DOCUMENTS

JP    2013149750 A    8/2013

OTHER PUBLICATIONS

International Search Report and Written Opinion for the International Patent Application No. PCT/US2019/059053, dated Feb. 21, 2020, 8 pages.

* cited by examiner

*Primary Examiner* — Shamim Ahmed (57) ABSTRACT

Optical grating components and methods of forming are provided. In some embodiments, a method includes providing an optical grating layer, and forming an optical grating in the optical grating layer, wherein the optical grating comprises a plurality of angled trenches disposed at a non-zero angle of inclination with respect to a perpendicular to a plane of the optical grating layer. The method may further include delivering light from a light source into the optical grating layer, and measuring at least one of: an undiffracted portion of the light exiting the optical grating layer, and a diffracted portion of the light exiting the optical grating layer.

16 Claims, 7 Drawing Sheets

SYSTEM AND METHOD FOR DETECTING ETCH DEPTH OF ANGLED SURFACE RELIEF GRATINGS

CROSS-REFERENCE TO RELATED APPLICATION

This application claims priority to U.S. Provisional Patent Application No. 62/767,944 filed Nov. 15, 2018, entitled "System and Method for Detecting Etch Depth of Angled Surface Relief Gratings," and incorporated by reference herein in its entirety.

FIELD

The disclosure relates to optical elements, and more particularly to approaches for optimally detecting etch depth of angled surface relief gratings.

BACKGROUND

Optical elements such as optical lenses have long been used to manipulate light for various advantages. Recently, micro-diffraction gratings have been utilized in holographic and augmented/virtual reality (AR and VR) devices.

One particular AR and VR device is a wearable display system, such as a headset, arranged to display an image within a short distance from a human eye. Such wearable headsets are sometimes referred to as head mounted displays, and are provided with a frame displaying an image within a few centimeters of the user's eyes. The image can be a computer generated image on a display, such as a micro display. The optical components are arranged to transport light of the desired image, where the light is generated on the display to the user's eye to make the image visible to the user. The display where the image is generated can form part of a light engine, so the image generates collimated light beams guided by the optical component to provide an image visible to the user.

Different kinds of optical components have been used to convey the image from the display to the human eye. To properly function in an augmented reality lens or combiner, the geometries of an optical grating may be designed to achieve various effects. In some devices, multiple different regions, such as two or more different regions, are formed on the surface of a lens, wherein the grating geometries in one region are different from the grating geometries in other regions.

Angled surface relief optical gratings can be produced by the direct etching of angled trenches into a substrate or a film stack on a substrate. One of the parameters controlling the efficiency of the optical grating is the trench depth. Etch rate can vary over time though, from sample to sample and from day to day, e.g., due to variations in etch source output, lot to lot variations in the characteristics of the material to be etched, time since maintenance on the etch equipment, and many other reasons. As a result, trench depth may be inconsistent, leading to inadequate results.

Therefore, with respect to at least the above drawbacks the present disclosure is provided.

SUMMARY

A method of forming an optical grating component may include providing an optical grating layer, and forming an optical grating in the optical grating layer, wherein the optical grating comprises a plurality of angled trenches. The method may further include delivering light from a light source into the optical grating layer, and measuring at least one of: an undiffracted portion of the light exiting the optical grating layer, and a diffracted portion of the light exiting the optical grating layer.

A method of forming an optical grating component may include providing an optical grating layer, and delivering a light into the optical grating layer. The method may further include etching the optical grating layer, while the light is traveling through the optical grating layer, to form an optical grating. The optical grating may have a plurality of angled components disposed at a non-zero angle of inclination with respect to a perpendicular to a plane of the optical grating layer. The method may further include detecting, during formation of the optical grating, at least one of: an undiffracted portion of the light exiting the optical grating layer, and a diffracted portion of the light exiting the optical grating layer.

A system for measuring properties of an optical grating may include a light source delivering a light into an optical grating layer, wherein an undiffracted portion of the light continues past an optical grating formed in the optical grating layer and exits the optical grating layer at a first exit point. Furthermore, a diffracted portion of the light may change direction at the optical grating and exit the optical grating layer at a second exit point. The system may further include at least one detector detecting the undiffracted portion of the light and the diffracted portion of the light, and a processing device. The processing device may be operable to receive a determined first light value of the undiffracted portion of the light and a second light value of the diffracted portion of the light. The processing device may be further operable to compare at least one of the first and second light values to a predetermined light value, wherein the predetermined light value correlates to a known optical grating trench depth. The processing device may be further operable to determine a depth of a plurality of angled trenches of the optical grating based on the comparison of the first and/or second light values to the predetermined light value.

BRIEF DESCRIPTION OF THE DRAWINGS

The accompanying drawings illustrate exemplary approaches of the disclosure, including the practical application of the principles thereof, as follows.

The drawings are not necessarily to scale. The drawings are merely representations, not intended to portray specific parameters of the disclosure. The drawings are intended to depict exemplary embodiments of the disclosure, and therefore are not to be considered as limiting in scope. In the drawings, like numbering represents like elements.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so the disclosure will be thorough and complete, and will fully convey the scope of the subject matter to those skilled in the art. In the drawings, like numbers refer to like elements throughout.

As used herein, an element or operation recited in the singular and proceeded with the word "a" or "an" are understood as possibly including plural elements or operations, except as otherwise indicated. Furthermore, references to "one embodiment" or "some embodiments" of the present disclosure may be interpreted as including the existence of additional embodiments also incorporating the recited features.

Furthermore, the terms "approximate" or "approximately," can be used interchangeably in some embodiments, and can be described using any relative measures acceptable by one of skill. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

Embodiments herein provide novel optical components and systems and methods for forming an optical component. Various embodiments are related to diffracted optical elements, where the term "optical grating component" refers to a device or part having an optical grating, including AR & VR headsets, eyepieces for AR & VR, or masters for forming optical gratings for eyepieces such as eyeglasses.

As mentioned above, etch rate of optical gratings can vary over time, from sample to sample and from day to day, etc., due to variations in etch source output, lot to lot variations in the characteristics of the material to be etched, time since maintenance on the etch equipment, and many other reasons. To address these deficiencies, embodiments herein provide a system and methods to detect the progress of the etch to enable a tighter distribution of results. More specifically, embodiments herein rely on the optical properties of the grating as the grating is being fabricated to detect when grating formation is done.

In some embodiments, the grating can be used in-situ as part of a system to monitor the evolution of the grating. A light source may introduce photons through the edge of the substrate. The photons propagate toward the grating, relying on internal reflection to remain in the substrate. At the grating, a portion, related to the grating depth, of the photons may be refracted with the remainder continuing on. Detection and comparision of the amount of light detected in a refracted position and a transmitted position can provide a metric of the trench depth increasing over time. Although described primarily herein using a change in relative intensity between the undiffracted and diffracted light as the metric, other characteristics, for instance the spatial distribution, might also be used. In some embodiments, depending on the grating orientation, the detector of refracted photons may be positioned within the platen or within the chamber, instead of being attached to the periphery of the platen.

Figure 1A:
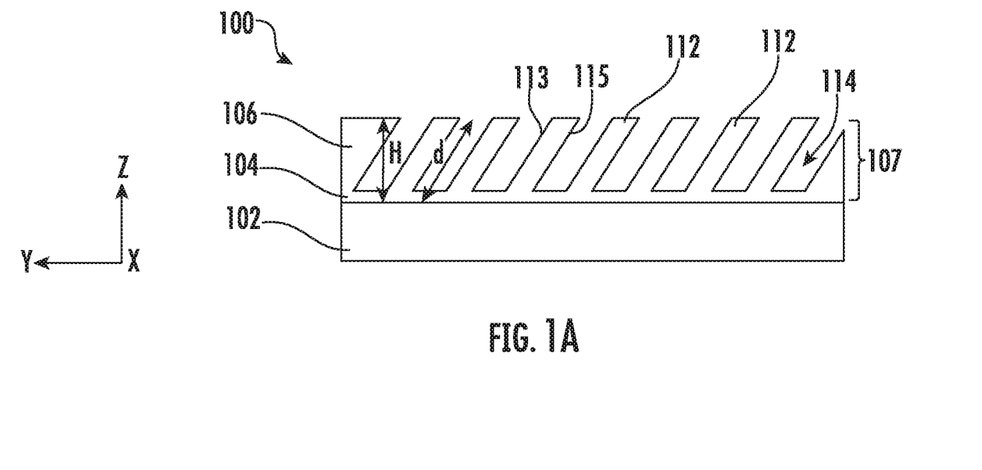
FIG. 1A depicts a side cross sectional view of an optical grating component according to embodiments of the disclosure.
Figure 1B:
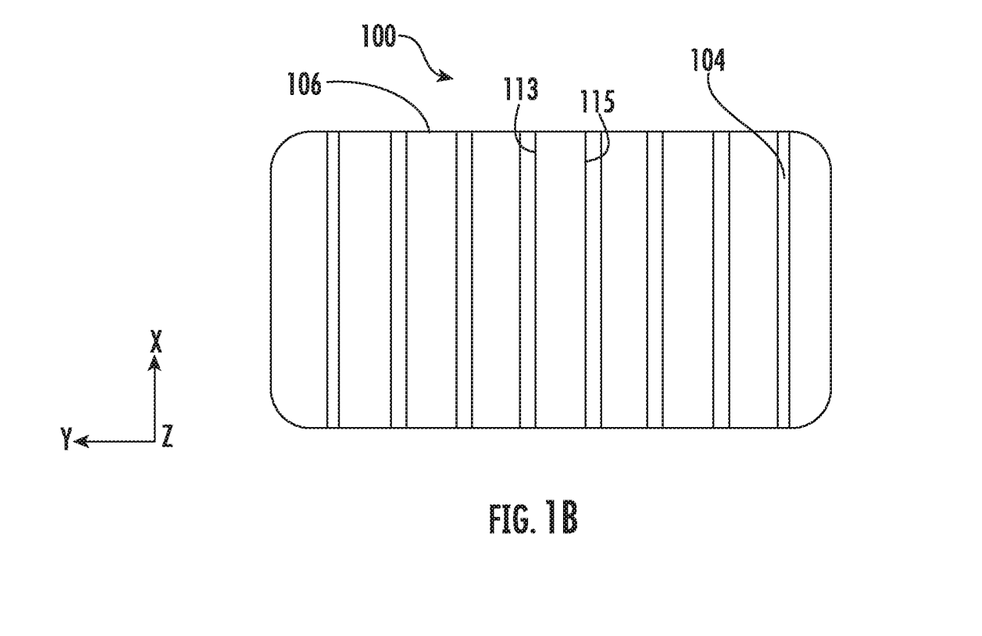
FIG. 1B depicts a top plan view of the optical grating component of FIG. 1A according to embodiments of the disclosure.

FIG. 1A depicts a side cross sectional view of an optical grating component 100, according to embodiments of the disclosure. FIG. 1B depicts a top plan view of the optical grating component 100. The optical grating component 100 may be used as an optical grating to be placed on an eyeglass or formed integrally in the eyeglass in accordance with various embodiments of the disclosure. The optical grating component 100 includes a substrate 102, and optical grating 106, disposed on the substrate 102. In some embodiments, the substrate 102 is an optically transparent material, such as a known glass. In some embodiments, the substrate 102 is silicon. In the latter case, the substrate 102 is silicon, and another process is used to transfer grating patterns to a film on the surface of another optical substrate, such as glass or quartz. The embodiments are not limited in this context. The optical grating 106 may be disposed in an optical grating layer 107, as described further below. In the embodiment of FIG. 1A and FIG. 1B, the optical grating component 100 further includes an etch stop layer 104, disposed between the substrate 102 and optical grating layer 107. According to some embodiments of the disclosure, the optical grating layer 107 may be an optically transparent material, such as silicon oxide, silicon nitride, glass, $TiO_2$, or other material.

According to some embodiments of the disclosure, the optical grating 106 may comprise a grating height H in the range of 100 nm to 1000 nm. As such, the optical grating 106 may be appropriate for use in an eyepiece of an AR &VR apparatus. Embodiments herein are not limited in this context. In accordance with some embodiments, the etch stop layer 104 may be an optically transparent material and may have a thickness of 10 nm to 100 nm. The embodiments are not limited in this context. Examples of a suitable material for the etch stop layer 104 include SiN, $SiO_2$, TiN, SiC, and other materials. In embodiments where the optical grating 106 is to be applied to or incorporated in an eyepiece of an eyeglass, an especially appropriate material is an optically transparent material. In embodiments where the optical grating component 100 forms a master for fabricating optical gratings for an eyepiece, the etch stop layer 104 need not be optically transparent. Moreover, the etch stop layer 104 may be omitted in some embodiments.

As further shown in FIG. 1A, the optical grating 106 may comprise a plurality of angled structures, shown as angled components or structures 112, disposed at a non-zero angle of inclination with respect to a perpendicular to a plane of the substrate 102. The angled structures 112 may be included within one or more fields of slanted gratings, the slanted grating together forming "micro-lenses." As will be described in greater detail below, the sidewalls 113 and 115 of each angled structure 112 may vary in angle (e.g., with respect to the perpendicular to the plane of the substrate 102) and shape as beam selectivity, beam angle spread, beam angle mean, etc., are modified. As will be described in greater detail below, the sidewalls 113 and 115 of each angled structure 112 may further vary in angle based on the selectivity between the angled structures 112 and a hardmask formed over the angled structures 112. As used herein, selectivity may be a product of the material(s) of the optical grating layer the angled structures 112 are formed, the chemistry of the etching ions, and tool parameters such as beam intensity, relative pressures of different gasses, and temperature.

Between the angled structures 112 is a plurality of trenches 114. The angled structures 112 may be arranged to define a uniform or variable height along a first direction. In the example of FIG. 1A, the angled structures 112 define a uniform height along the direction parallel to the Y-axis of the Cartesian coordinate system shown, where the first direction (Y-Axis) is parallel to the plane of the substrate 102, i.e., the X-Y plane. In other embodiments, the angled structures 112 may define a variable height along the direction parallel to the Y-axis. The plurality of trenches 114 may be disposed at a non-zero angle of inclination with respect to a perpendicular to a plane, such as a top surface of the substrate 102 or a top surface of optical grating layer 107.

The width of the optical grating 106 along the Y-direction may be on the order of several millimeters to several centimeters, while the grating height H may be on the order of 1 micrometer or less. Accordingly, the variation in grating height H may range on the order of several hundred nanometers or less. An example of a smooth variation in grating height H or depth d is where a change in grating height H or depth d between adjacent lines of a grating is less than 10%, less than 5%, or less than 1%. The embodiments are not limited in this context. Thus, in an eyepiece, the grating height H may vary continuously and in a non-abrupt fashion in a given direction along the surface of the eyepiece over a distance of, for example, millimeters to centimeters. More particularly, a change in grating height H of 50% over a 5 mm distance may entail changing the grating height H continuously over approximately $5 \times 10^3$ lines having a pitch of one micrometer. The change entails an average change in relative height of adjacent lines of $0.5/5 \times 10^4$ or approximately 0.01%.

Figure 2A:
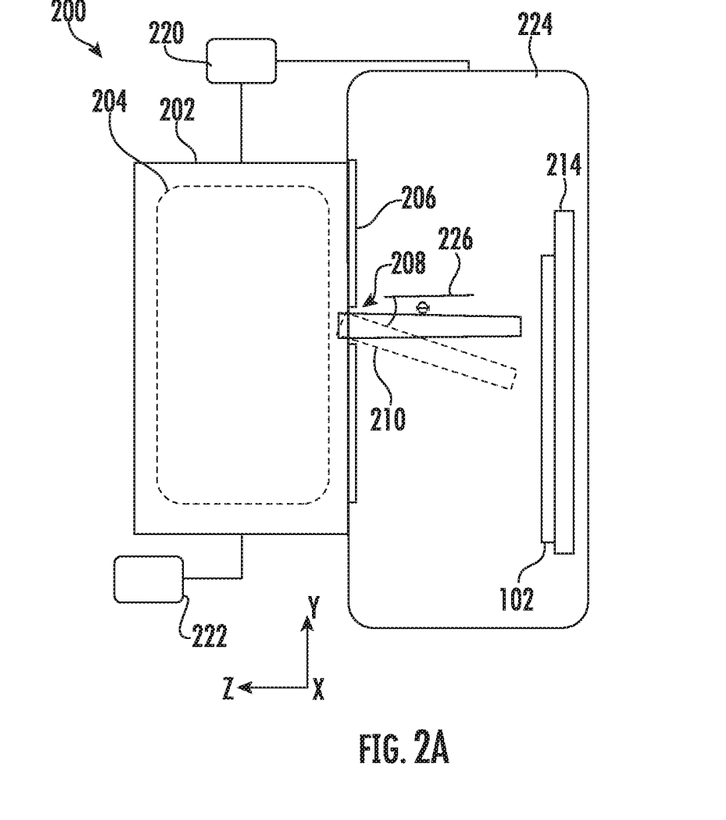
FIG. 2A shows a processing apparatus, depicted in schematic form, in accordance with embodiments of the present disclosure.

Turning now to FIG. 2A, there is shown a processing apparatus 200, depicted in schematic form. The processing apparatus 200 represents a processing apparatus for etching portions of a substrate, or depositing on a substrate, to generate, for example, the optical gratings of the present embodiments. The processing apparatus 200 may be a plasma based processing system having a plasma chamber 202 for generating a plasma 204 therein by any convenient method as known in the art. An extraction plate 206 may be provided as shown, having an extraction aperture 208, where a non-uniform etching or non-uniform deposition may be performed to reactively etch or deposit an optical grating layer 107 (FIGS. 1A-B). A substrate 102, including, for example, the aforementioned optical grating structure, is disposed in the process chamber 224. A substrate plane of the substrate 102 is represented by the X-Y plane of the Cartesian coordinate system shown, while a perpendicular to the plane of the substrate 102 lies along the Z-axis (Z-direction).

As further shown in FIG. 2A, an ion beam 210 may be extracted when a voltage difference is applied using bias supply 220 between the plasma chamber 202 and substrate 102, or substrate platen 214, as in known systems. The bias supply 220 may be coupled to the process chamber 224, for example, where the process chamber 224 and substrate 102 are held at the same potential.

According to various embodiments, the ion beam 210 may be extracted along the perpendicular 226 or may be extracted at a non-zero angle of incidence, shown as ϕ, with respect to the perpendicular 226.

The trajectories of ions within the ion beam 210 may be mutually parallel to one another or may lie within a narrow angular spread range, such as within 10 degrees of one another or less. In other embodiments, as will be discussed below, the trajectory of ions within the ion beam 210 may converge or diverge from one another, for example, in a fan shape. Thus, the value of ϕ may represent an average value of incidence angle where the individually trajectories vary up to several degrees from the average value. In various embodiments, the ion beam 210 may be extracted as a continuous beam or as a pulsed ion beam as in known systems. For example, the bias supply 220 may be configured to supply a voltage difference between the plasma chamber 202 and the process chamber 224, as a pulsed DC voltage, where the voltage, pulse frequency, and duty cycle of the pulsed voltage may be independently adjusted from one another.

In various embodiments, gas, such as reactive gas, may be supplied by the source 222 to plasma chamber 202. The plasma 204 may generate various etching species or depositing species, depending upon the exact composition of species provided to the plasma chamber 202.

Figure 2B:
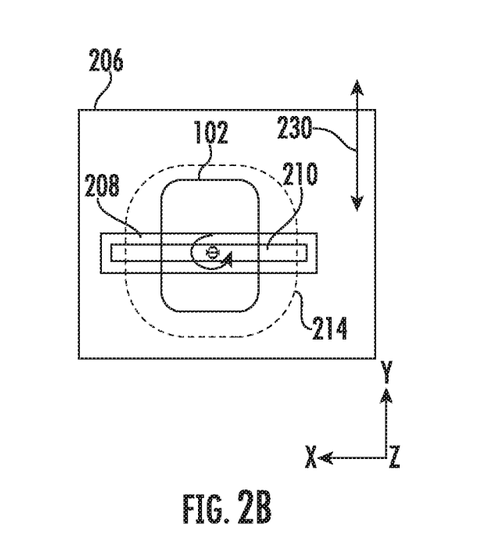
FIG. 2B shows an extraction plate component and substrate in top plan view in accordance with embodiments of the present disclosure.

In various embodiments, the ion beam 210 may be provided as a ribbon reactive ion beam having a long axis extending along the X-direction of the Cartesian coordinate system shown in FIG. 2B. By scanning a substrate platen 214 including substrate 102 with respect to the extraction aperture 208, and thus with respect to the ion beam 210 along the scan direction 230, the ion beam 210 may etch the substrate 102 or deposit upon the substrate 102. The ion beam 210 may be composed of any convenient gas mixture, including inert gas, reactive gas, and may be provided in conjunction with other gaseous species in some embodiments. In particular embodiments, the ion beam 210 and other reactive species may be provided as an etch recipe to the substrate 102 so as to perform a directed reactive ion etching of a layer, such as the optical grating layer 107. Such an etch recipe may use known reactive ion etch chemistries for etching materials such as oxide or other material, as known in the art. In other embodiments, the ion beam 210 may be formed of inert species where the ion beam 210 is provided to etch the substrate 102 or more particularly, the optical grating layer 107, by physical sputtering, as the substrate 102 is scanned with respect to ion beam 210.

In the example of FIG. 2B, the ion beam 210 is provided as a ribbon reactive ion beam extending to a beam width along the X-direction, where the beam width is adequate to expose an entire width of the substrate 102, even at the widest part along the X-direction. Exemplary beam widths may be in the range of 10 cm, 20 cm, 30 cm, or more while exemplary beam lengths along the Y-direction may be in the range of 2 mm, 3 mm, 5 mm, 10 mm, or 20 mm. The embodiments are not limited in this context.

Notably, the scan direction 230 may represent the scanning of substrate 102 in two opposing (180 degrees) directions along the Y-direction, or just a scan toward the left or a scan toward the right. As shown in FIG. 2B, the long axis of ion beam 210 extends along the X-direction, perpendicularly to the scan direction 230. Accordingly, an entirety of the substrate 102 may be exposed to the ion beam 210 when scanning of the substrate 102 takes place along a scan direction 230 to an adequate length from a left side to right side of substrate 102.

The grating features may be accomplished by scanning the substrate 102 with respect to the ion beam 210 using a processing recipe. In brief, the processing recipe may entail varying at least one process parameter of a set of process parameters, having the effect of changing, e.g., the etch rate or deposition rate caused by the ion beam 210 during scanning of the substrate 102. Such process parameters may include the scan rate of the substrate 102, the ion energy of the ion beam 210, duty cycle of the ion beam 210 when provided as a pulsed ion beam, the spread angle of the ion beam 210, and rotational position of the substrate 102. In at least some embodiments herein, the processing recipe may further include the material(s) of the optical grating layer 107, and the chemistry of the etching ions. In yet other embodiments, the processing recipe may include starting geometry of the optical grating layer 107, including dimensions and aspect ratios. The embodiments are not limited in this context.

Figure 3:
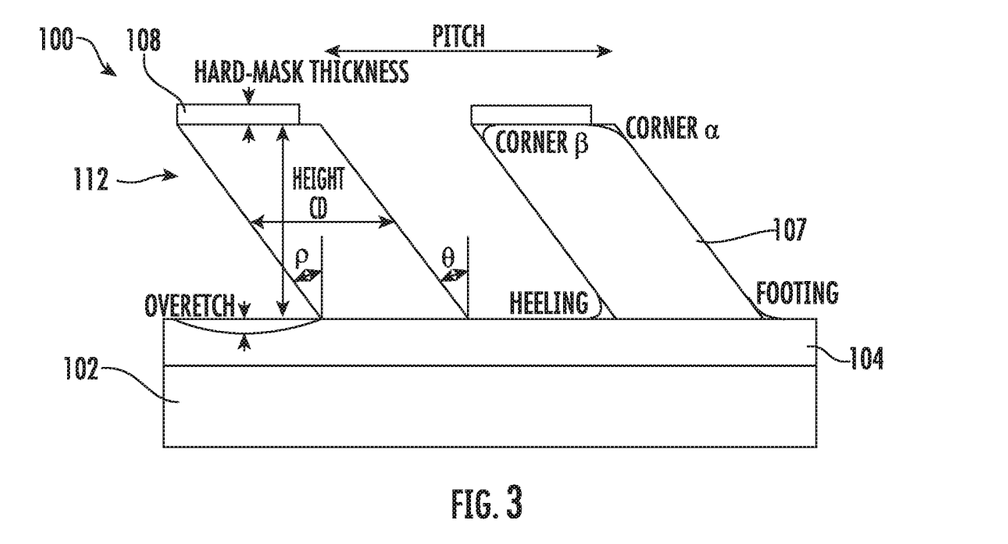
FIG. 3 shows a side cross-sectional view of angled structures formed in an optical grating layer in accordance with embodiments of the present disclosure.

Turning now to FIG. 3, an example set of fins or angled structures 112 formed in the optical grating layer 107 by the etch processes of the embodiments herein will be described in greater detail. The angled structures 112 may be formed by any of the above described etch processes to manufacture the angled structures 112 with unique locations, shapes, three dimensional orientations, etc. In some examples, the etch processes are capable of controlling or modifying any of the following grating parameters of the set of angled structures 112: pitch, hardmask 108 thickness, and fin height/trench depth. The etch processes are also capable of controlling or modifying any of the following grating parameters: fin thickness (CD), corner radius β and α, over-etch into the etch stop layer 104, heeling, first sidewall angle ρ, second sidewall angle θ, and footing.

Figure 4:
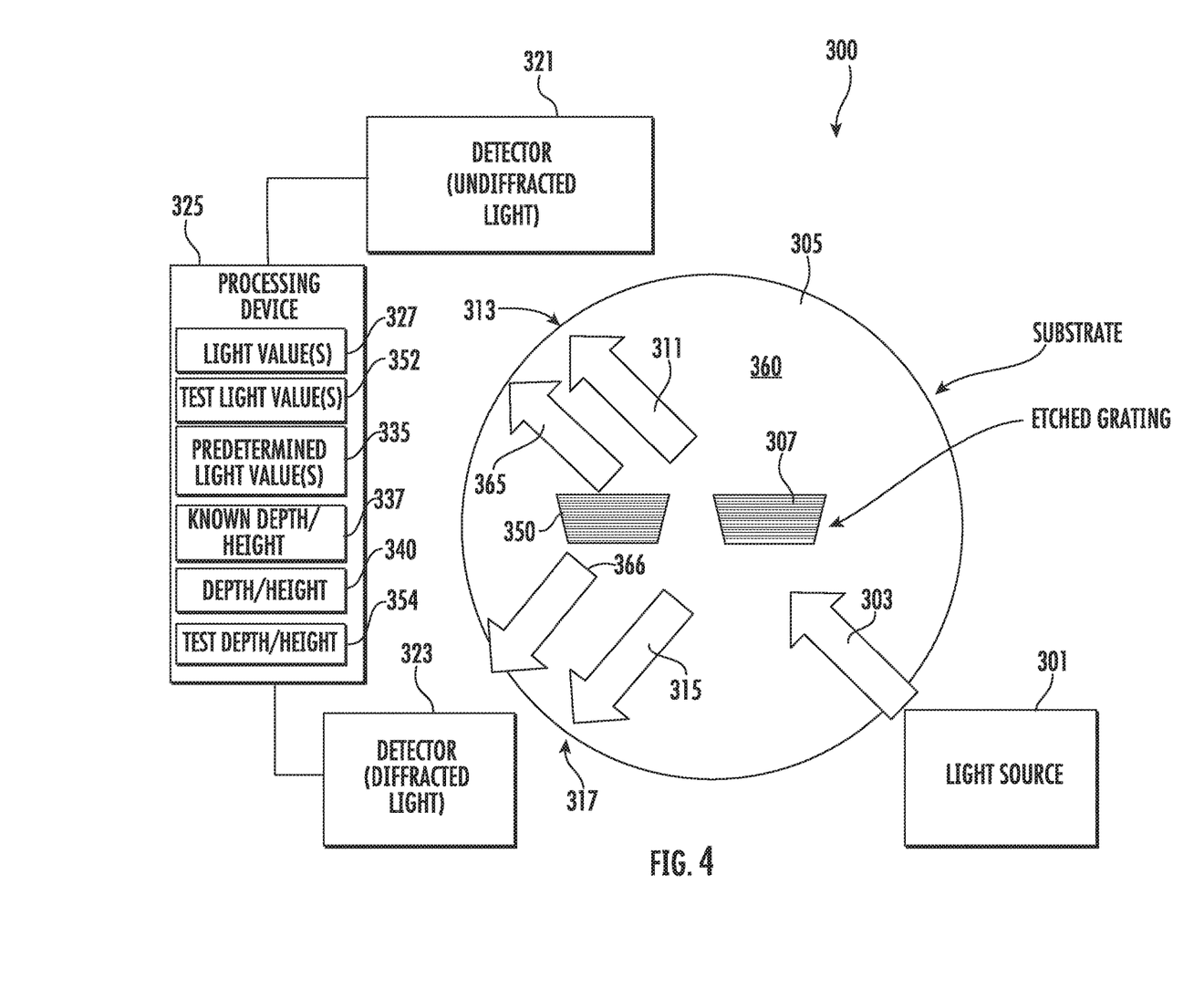
FIG. 4 shows a system for measuring properties of an optical grating according to embodiments of the present disclosure.

Turning now to FIG. 4 a system 300 for measuring properties of an optical grating layer 305 according to embodiments of the present disclosure will be described in greater detail. The optical grating layer 305 may be the same or similar to the optical grating layer 107 shown in FIG. 3. Although non-limiting, the system 300 may include a light source 301 delivering a light 303 into a substrate or optical grating layer 305. In some embodiments, the light 303 may be a plurality of rays and photons directed towards an optical grating 307, wherein the optical grating 307 may be etched into the optical grating layer 305. As shown, an undiffracted portion 311 of the light 303 may continue past the optical grating 307 and exit the optical grating layer 305 at a first exit point 313. A diffracted portion 315 of the light 303 may impact the optical grating 307 and change direction, exiting the optical grating 307 at a second exit point 317.

The system 300 may further include a first detector 321 receiving/detecting the undiffracted portion 311 of the light 303, and a second detector 323 receiving/detecting the diffracted portion 315 of the light 303. As shown, the first detector 321 may be positioned proximate the first exit point 313, while the second detector 323 may be positioned proximate the second exit point 317. In some embodiments, the first and second detectors 321, 323 may be capable of sensing an intensity of the undiffracted portion 311 and the diffracted portion 315, respectively. The undiffracted portion 311 and the diffracted portion 315 of the light 303 may be converted to corresponding electrical signals sampled at regular intervals and digitized to produce corresponding light intensity values (for instance in W or W/m$^2$).

The light intensity values may be delivered to a processing device 325 programmed to perform analysis of the signals, as will be described in greater detail below. In various embodiments, different classes of light intensities may also be associated with other parameters affecting the scanning and the sensing of reflected light, such as spectral differences. In the non-limiting embodiment shown, the processing device 325 may be operable to receive one or more light values 327 determined from the undiffracted portion 311 and/or the diffracted portion 315 of the light 303. In some embodiments, the light values 327 may be light intensities of the undiffracted portion 311 and/or the diffracted portion 315 of the light 303. Alternatively, the light value 327 may be the difference, over a period of time, between the light intensity of the undiffracted portion 311 of the light 303 and the intensity of the diffracted portion 315 of the light 303. In other embodiments, the light value 327 may correspond to a spatial distribution of the undiffracted portion 311 and/or the diffracted portion 315 of the light 303

The processing device 325 may be further operable to compare the light value(s) 327 of the undiffracted portion 311 and/or the diffracted portion 315 of the light 303 to a predetermined light value 335. The predetermined light value 335, stored in memory (not shown), may be part of a plurality of known light intensity values previously obtained or determined for a given optical grating characteristic, such as trench depth/angled component height. Said differently, for each of a series of known grating trench depths/angled component heights 337, corresponding light intensities are provided. In various embodiments, the predetermined light value 335 may be known intensities of the undiffracted portion 311 and/or the diffracted portion 315 of the light 303. Alternatively, the predetermined light value 335 may be a known relative difference between the undiffracted portion 311 and the diffracted portion 315 of the light 303.

The processing device 325 may be further operable to determine a depth/height 340 of the plurality of angled components of the optical grating 307 based on the comparison of the determined light value(s) 327 to the predetermined light value 335. For example, when the determined light value(s) 327 is equal, or approximately equal, to the predetermined light value 335, the depth/height 340 of the plurality of angled components will be equal to the known grating trench depth/angled component height 337 linked with the predetermined light value 335. The processing device 325 may be able to determine the depth of the trenches in situ, e.g., as the optical grating 307 is being etched. Once the grating trench depth/angled component height of the plurality of angled components of the optical grating 307 is equal to the known grating trench depth/ angled component height, as determined by a match between the determined light value(s) 327 to the predetermined light value 335, the etching to the optical grating 307 may cease. In some embodiments, the processing device 325 may send a signal to the processing apparatus 200 (FIG. 2A) to prevent further processing to the optical grating layer 305.

As further shown, the light source 301, or an additional light source (not shown), may deliver the light 303 into a test optical grating 350. An undiffracted portion 365 of the light 303 may continue past the test optical grating 350 and exit the optical grating layer 305. A diffracted portion 366 of the light 303 may impact the test optical grating 350 and change direction, exiting the optical grating 307 at a second exit point.

The first detector 321, or an additional detector (not shown), may receive and detect the undiffracted portion 365 of the light 303, and the second detector 323, or an additional detector (not shown), may receive and detect the diffracted portion 366 of the light 303 from the test optical grating 350. In some embodiments, the first and second detectors 321, 323 may be capable of sensing an intensity of the undiffracted portion 365 and the diffracted portion 366 of the light 303 after reaching the test optical grating 350.

Similar to above, the undiffracted portion 365 and the diffracted portion 366 of the light 303 may be converted to corresponding electrical signals sampled at regular intervals and digitized to produce corresponding light intensity values (for instance in W or W/m$^2$).

The light intensity values corresponding to the test optical grating 350 may be delivered to the processing device 325 programmed to perform analysis of the signals, as will be described in greater detail below. In various embodiments, different classes of light intensities may also be associated with other parameters affecting the scanning and the sensing of reflected light, such as spectral differences. In the non-limiting embodiment shown, the processing device 325 may be operable to receive one or more test light values 352 determined from the undiffracted portion 365 and/or the diffracted portion 366 of the light 303 interacting with the test optical grating 350. In some embodiments, the test light values 352 may be light intensities of the undiffracted portion and/or the diffracted portion of the light 303. Alternatively, the test light value 352 may be the difference, over a period of time, between the light intensity of the undiffracted portion 365 of the light 303 and the intensity of the diffracted portion 366 of the light 303. In other embodiments, the test light value 352 may correspond to a spatial distribution of the undiffracted portion 365 and/or the diffracted portion 366 of the light 303 interacting with the test optical grating 350.

The processing device 325 may be further operable to compare the test light value(s) 352 of the undiffracted portion 365 and/or the diffracted portion 366 of the light 303 to the predetermined light value 335. Furthermore, the light value(s) 327 of the undiffracted portion 311 and/or the diffracted portion 315 of the light 303 impacting the optical grating 307 may also be compared to the test light value 352. The processing device 325 may be further operable to determine a depth/height 354 of the trenches of the test optical grating 350 based on the comparison of the test light value 352 to the predetermined light value 335. The processing device 325 may be further operable to determine a depth/height 340 of the plurality of angled components of the optical grating 307. The determination may be based on a comparison of the determined light value(s) 327 to at least one of: the predetermined light value 335, the test light value 352, and/or the depth/height 354 of the trenches of the test optical grating 350. When the determined light value(s) 327 is equal, or approximately equal, to the predetermined light value 335 or the test light value 352, depth/height 340 of the plurality of angled components will be equal to the known grating trench depth/angled component height 337 linked with the predetermined light value 335 and/or the test light value 352. As such, the processing device 325 can determine the depth of the trenches in situ, e.g., as the optical grating 307 and/or the test optical grating 350 are being etched. Once the grating trench depth/angled component height of the trenches of the optical grating 307 and/or the test optical grating 350 is equal to the known grating trench depth/angled component height, as determined by a match between the determined light value(s) 327 to the predetermined light value 335 and/or the test light value 352, the etching to the optical grating 307 and/or the test optical grating 350 may cease. In some embodiments, the processing device 325 may send a signal to the processing apparatus 200 (FIG. 2A) to prevent further processing to the optical grating 307 and/or test optical grating 350.

Although shown along a first surface 360 (e.g., an upper surface) of the optical grating layer 305, the test optical grating 350 may be along front and/or back side of the optical grating layer 305. The test optical grating 350 may be formed/positioned in a known location, both on the optical grating layer 305 and relative to the optical grating 307, to enable easier testing when device layout changes.

Figure 5A:
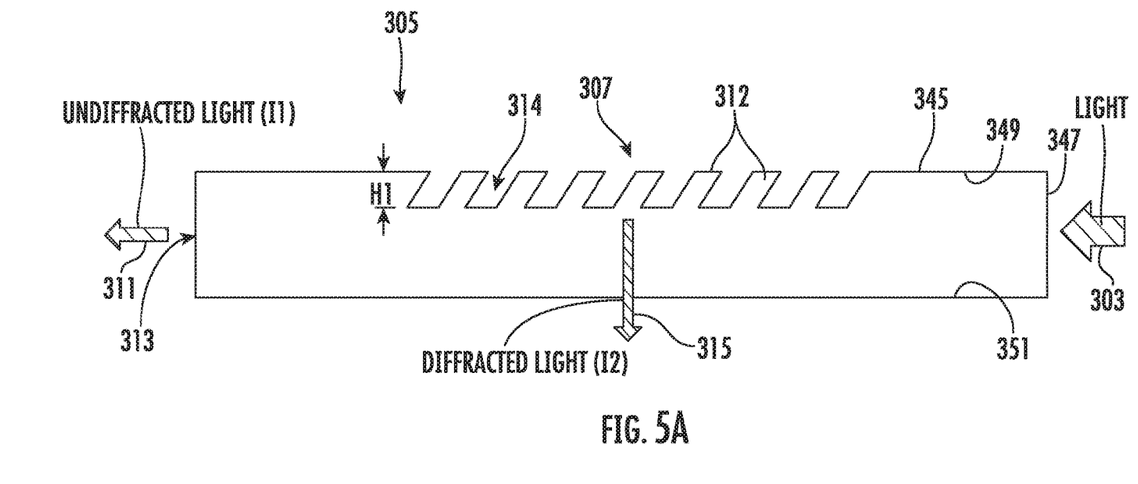
FIGS. 5A-5B show the optical grating layer during processing according to embodiments of the present disclosure.
Figure 5B:
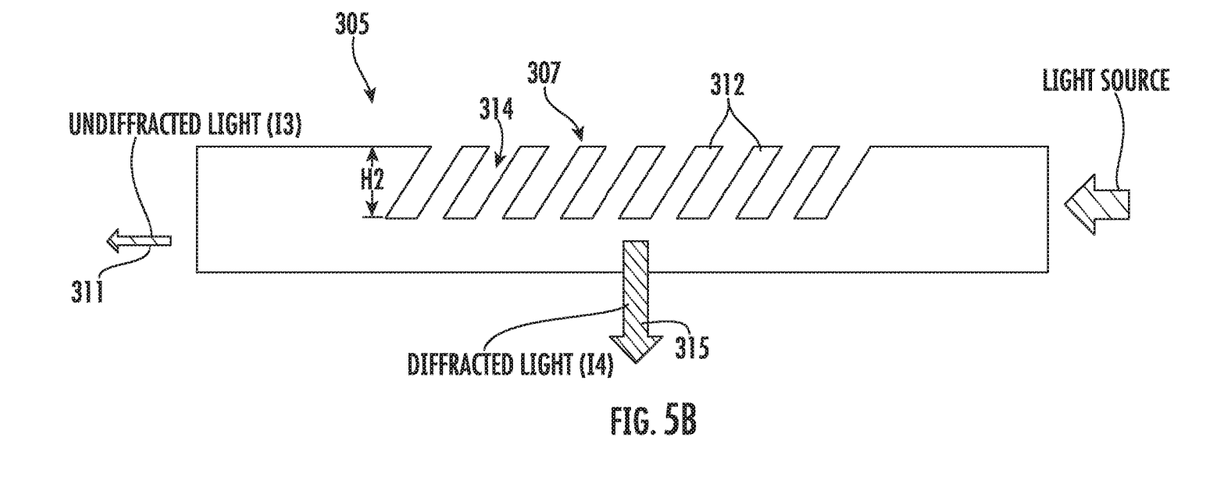

Turning now to FIGS. 5A-5B, propagation of the light 303 through the optical grating layer 305 during formation of the optical grating 307 according to embodiments of the present disclosure will be described in greater detail. As shown, the optical grating layer 305 is provided with an optical grating 307 formed therein. The optical grating 307 includes a plurality of angled structures 312, disposed at a non-zero angle of inclination with respect to a perpendicular to a plane 345 (e.g., top surface) of the optical grating layer 305. The angled structures 312 are formed by etching a plurality of trenches 314 into the optical grating layer 305. Therefore, the plurality of trenches 314 may also be disposed at the non-zero angle of inclination. In non-limiting embodiments, the grating height H1 may be on the order of 0.5 micrometer or less.

As shown, the light 303 may be introduced into the optical grating layer 305 through a side surface 347 thereof. In some embodiments, the light 303 is introduced along a plane approximately parallel to the plane 345. The light 303 may include a plurality of rays and photons propagating through the optical grating layer 305, reflecting internally between an upper inner surface 349 and a lower inner surface 351. As shown, the undiffracted portion 311 of the light 303 continues past (e.g., beneath) the optical grating 307 and exits the optical grating layer 305 at the first exit point 313. The undiffracted portion 311 may be recognized by the first detector 321 (FIG. 4) as having a first intensity, I1. Meanwhile, the diffracted portion 315 of the light 303 changes direction at the optical grating 307 and exits the optical grating layer 305 at a second exit point. The diffracted portion 315 may be recognized by the second detector 323 (FIG. 4) as having a second intensity, I2.

As processing of the optical grating 307 continues, demonstrated in FIG. 5B, the plurality of trenches 314 deepen, causing the height H2 of the plurality of angled structures 312 to effectively increase. In some embodiments, the grating height H2 may be between approximately 0.5 micrometers and 1.0 micrometers. As shown, the undiffracted portion 311 of the light 303 continues past (e.g., beneath) the optical grating 307 and exits the optical grating layer 305 at the first exit point 313. The undiffracted portion 311 may be recognized by the first detector 321 (FIG. 4) as having a third intensity, I3. Meanwhile, the diffracted portion 315 of the light 303 changes direction at the optical grating 307 and exits the optical grating layer 305 at the second exit point 317. The diffracted portion 315 may be recognized by the second detector 323 (FIG. 4) as having a fourth intensity, I4. Comparing processing of the optical grating layer 305 as shown between FIGS. 5A-5B, H1>H2, thus causing I3>I1 for the undiffracted portion 311 and I4>I2 for diffracted portion. Stated another way, as the trenches 314 of the optical grating 307 deepen, more of the light 303 is diffracted by the optical grating 307. The difference can be captured, and used to accurately determine trench depth optically, as described above.

Figure 6A:
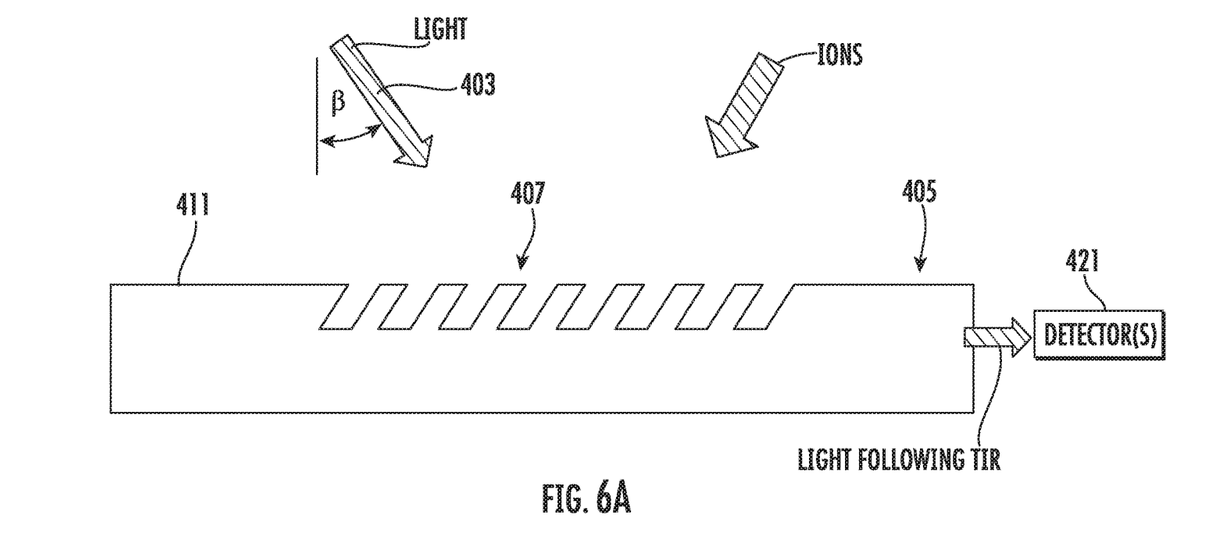
FIGS. 6A-6B show the optical grating layer during processing according to embodiments of the present disclosure.
Figure 6B:
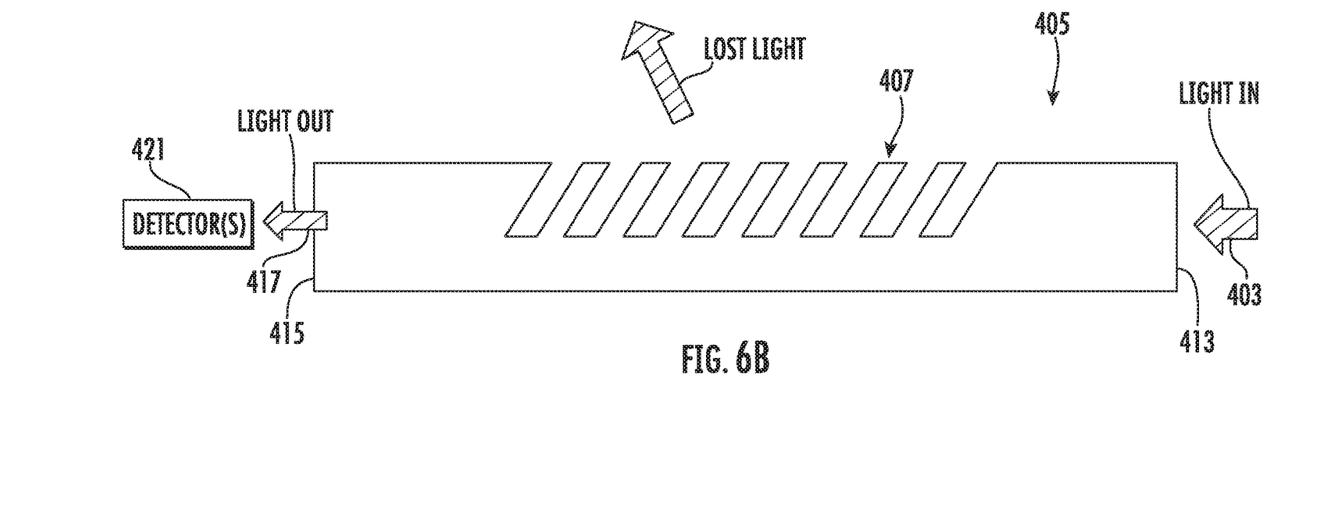

FIGS. 6A-6B demonstrate a variety of light source and detector arrangements according to various embodiments of the disclosure. In the embodiment of FIG. 6A, a light 403 from free space is injected into the optical grating 407 of the optical grating layer/substrate 405 and one or more detectors 421 measure light propagation after total internal reflection (TIR) and propagation through the optical grating/substrate 405. In some non-limiting implementations, the light 403 is directed into the optical grating 407 at a non-zero angle of inclination (β) with respect to a perpendicular to a plane (e.g., top surface 411) of the optical grating layer 405. In the embodiment of FIG. 6B, a light 403 is injected through a first side/edge 413 of the optical grating/substrate 405, and the output light 417 is detected through a second side/edge 415 of the optical grating/substrate 405. As shown, the optical grating 407 separates the first and second sides 413 and 415. The detector 421 may be configured to measure the light 'lost' to diffractive outcoupling.

For example, in other embodiments, measurement may be obtained in various other physical locations or points in the process. In a first example, measurement can be taken on the mainframe. In some cases, measurement is not on the actual chamber. Instead, the measurement is outside, either in the transfer chamber or a separate measurement chamber. In a second example, measurement may be made on the factory interface (FI). The measurement may be similar to an optical metrology tool capable of being placed on a loadport or on the side of a FI.

Figure 7:
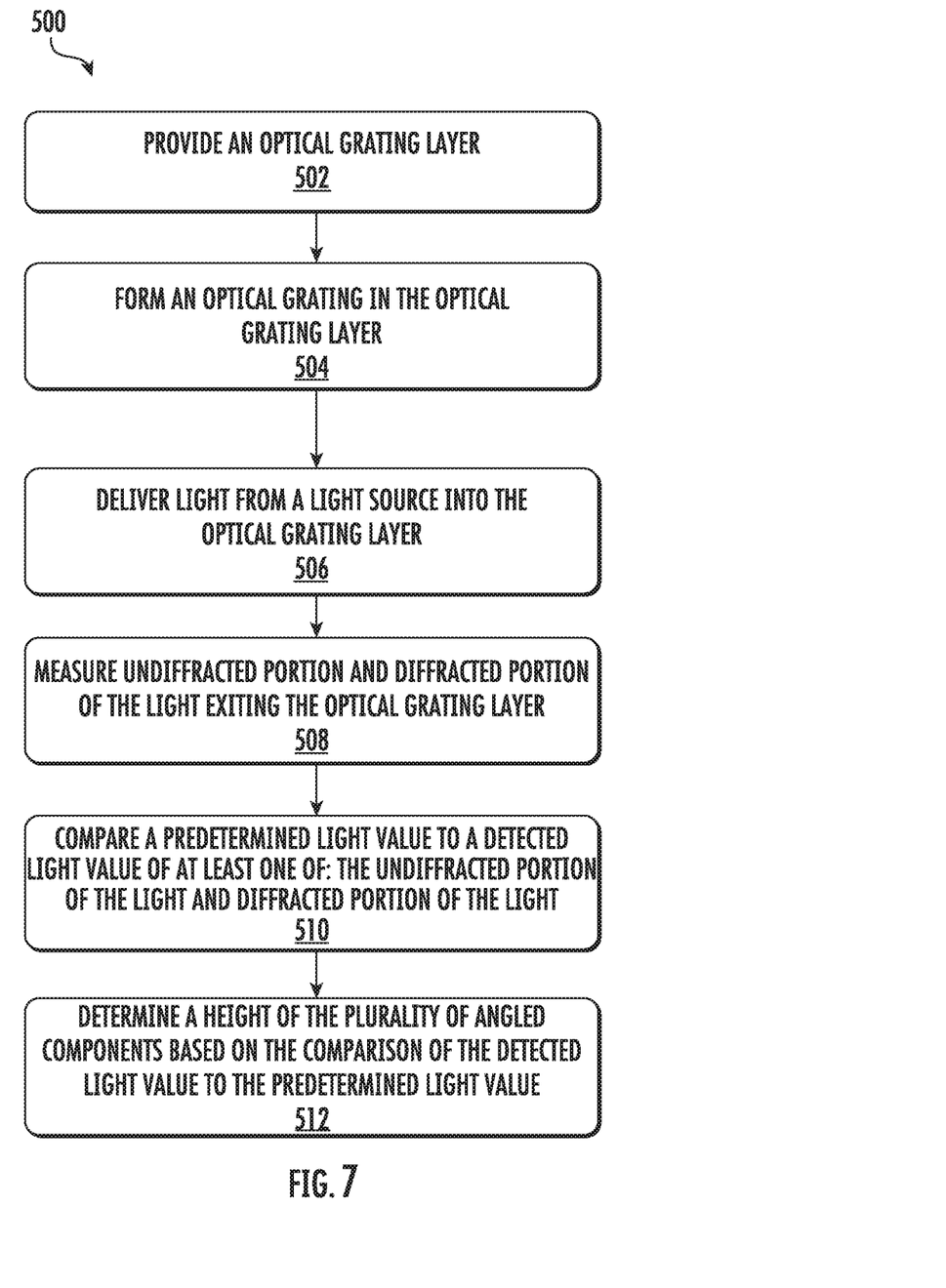
FIG. 7 depicts a process flow in accordance with embodiments of the disclosure.

Turning now to FIG. 7, a method 500 according to embodiments of the present disclosure will be described in greater detail. Specifically, at block 502, an optical grating layer is provided. In some embodiments, the optical grating layer is formed over a substrate. In some embodiments, the optical grating layer may comprise an optically transparent material, including, yet not limited to, silicon oxide, silicon nitride, glass, or other material. In some embodiments, the optical grating layer is formed atop an etch stop layer. The etch stop layer may be an optically transparent material and may have a thickness of 10 nm to 100 nm.

At block 504, the method 500 may include forming an optical grating in the optical grating layer, wherein the optical grating includes a plurality of angled trenches disposed at a non-zero angle of inclination with respect to a perpendicular to a plane of the optical grating layer. In some embodiments the plurality of angled trenches have a uniform depth. In some embodiments, the plurality of angled trenches are formed by a reactive ion etch into the optical grating layer. In some embodiments, the optical grating may be a test grating not part of the active device.

At block 506, the method 500 may include delivering light from a light source into the optical grating layer. In some embodiments, the light is delivered into the optical grating layer as the optical grating is being formed.

At block 508, the method may further include measuring an undiffracted and a diffracted portion of the light exiting the optical grating layer. In some embodiments, the undiffracted and the diffracted portion of the light is measured by one or more detectors positioned proximate an edge of the optical grating layer. In some embodiments, the undiffracted and the diffracted portion of the light are continuously or periodically measured while the optical grating is being formed.

At block 510, the method 500 may further include comparing a predetermine light value to a detected light value of at least one of: the undiffracted portion of the light and the diffracted portion of the light, wherein the predetermined light value corresponds to a known angled component height. In some embodiments, the detected light value is a light intensity.

At block 512, the method 500 may further include determining a height of the plurality of angled components based on the comparison of the detected light value to the predetermined light value.

Embodiments herein may be computer implemented. For example, the processing apparatus 200 and/or the system 300 may include a computer processor, such as the processing device 325, to perform logic operations, computational tasks, control functions, etc. In some embodiments, the computer processor may be a component of a processor. The computer processor may include one or more subsystems, components, modules, and/or other processors, and may include various logic components operable using a clock signal to latch data, advance logic states, synchronize computations and logic operations, and/or provide other timing functions. During operation, the computer processor may receive signals transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, the computer processor executes computer program instructions or code stored in a memory unit and/or storage system. For example, when executing computer program instructions, the computer processor causes the processing apparatus 200 to receive inputs, such as any of the processing parameters discussed herein, and provide, from the computer processor, the outputs. In some embodiments, the computer processor executes and carries out the processing recipe to form optical grating component 100 and optical grating layer 305.

While executing computer program code, the computer processor can read and/or write data to/from the memory unit and/or the storage system. The storage system may comprise VCRs, DVRs, RAID arrays, USB hard drives, optical disk recorders, flash storage devices, and/or any other data processing and storage elements for storing and/or processing data. Although not shown, the processing apparatus 200 could also include I/O interfaces communicating with one or more hardware components of computer infrastructure to enable a user to interact with the processing apparatus 200 (e.g., a keyboard, a display, camera, etc.).

In sum, various embodiments described herein provide approaches for forming optical grating components. Manufacturing may be accomplished by direct application of the angled ions on the substrate, and/or on a mask used to transfer the pattern to the substrate of interest. A first technical advantage of the present embodiments includes efficiently controlling the trench depth of the grating, as the grating can be used in situ as part of a system to monitor the evolution of the grating. A second technical advantage of the present embodiments is the use of optical depth detection techniques, as these techniques are less intrusive and results in less downtime.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A method of forming an optical grating component, comprising:
   providing an optical grating layer;
   forming an optical grating in the optical grating layer, wherein the optical grating comprises a plurality of angled trenches;
   delivering light from a light source into the optical grating layer; and
   simultaneously measuring, while the plurality of angled trenches are being formed, at least one of: an undiffracted portion of the light exiting the optical grating layer, and a diffracted portion of the light exiting the optical grating layer.

2. The method of claim 1, further comprising:
   comparing a baseline light value to a detected light value of at least one of: the undiffracted portion of the light and the diffracted portion of the light, wherein the baseline light value corresponds to a known angled trench depth; and
   determining a depth of the plurality of angled trenches based on the comparison of the detected light value to the baseline light value, wherein the detected light value is a light intensity.

3. The method of claim 2, further comprising:
   forming a test optical grating in the optical grating layer, wherein the optical grating comprises a second plurality of angled trenches; and
   measuring at least one of: an undiffracted portion of the light passing by the test optical grating, and a diffracted portion of the light exiting the optical grating layer after engagement with the test optical grating.

4. The method of claim 2, further comprising measuring a difference, over a period of time, between the light intensity of the undiffracted portion of the light and the light intensity of the diffracted portion of the light.

5. The method of claim 2, wherein forming the optical grating comprises etching the optical grating layer to form the plurality of angled trenches, and wherein the etching comprises an angled reactive ion etch.

6. The method of claim 5, further comprising stopping the etching of the optical grating layer when the depth of the plurality of trenches equals a baseline depth.

7. The method of claim 1, wherein the plurality of angled trenches is disposed at a non-zero angle of inclination with respect to a perpendicular to a plane of the optical grating layer.

8. The method of claim 1, further comprising measuring the undiffracted portion of the light and the diffracted portion of the light while the plurality of angled trenches are being etched.

9. A method of forming an optical grating component, comprising:
   providing an optical grating layer;
   delivering a light into the optical grating layer;
   etching the optical grating layer, while the light is traveling through the optical grating layer, to form an optical grating, the optical grating having a plurality of angled components disposed at a non-zero angle of inclination with respect to a perpendicular to a plane of the optical grating layer; and
   detecting, during formation of the plurality of angled components, at least one of: an undiffracted portion of the light exiting the optical grating layer, and a diffracted portion of the light exiting the optical grating layer.

10. The method of claim 9, further comprising:
    comparing a baseline light value to a detected light value of at least one of: the undiffracted portion of the light and the diffracted portion of the light, wherein the predetermined light value corresponds to a known angled component height;
    determining a height of the plurality of angled components based on the comparison of the predetermined light value and the detected light value; and
    stopping etching of the optical grating layer when the height of the plurality of angled components is approximately equal to the known angled component height.

11. The method of claim 10, wherein the detected light value is a light intensity.

12. The method of claim 11, further comprising measuring a difference, over a period of time, between the light intensity of the undiffracted portion of the light and the light intensity of the diffracted portion of the light.

13. The method of claim 9, wherein the light is delivered directly into the optical grating layer at a non-zero angle of inclination with respect to a perpendicular to a plane of the optical grating layer.

14. The method of claim 13, wherein the undiffracted portion of the light is measured to determine an amount of the light lost as a result of the optical grating.

15. The method of claim 9, wherein the light is delivered into an edge of the optical grating layer.

16. The method of claim 9, wherein the undiffracted portion of the light continues past the optical grating and exits the optical grating layer at a first exit point, and wherein the diffracted portion of the light changes direction at the optical grating and exits the optical grating layer at a second exit point.

* * * * *